US005509037A

United States Patent [19]
Buckner et al.

[11] Patent Number: 5,509,037
[45] Date of Patent: Apr. 16, 1996

[54] DATA PHASE ALIGNMENT CIRCUITRY

[75] Inventors: Wade B. Buckner, Austin; David A. Roberts, Buda; Keith G. Hawkins, Dripping Springs, all of Tex.

[73] Assignee: DSC Communications Corporation, Plano, Tex.

[21] Appl. No.: 161,906

[22] Filed: Dec. 1, 1993

[51] Int. Cl.⁶ .......................... H04L 7/00; H04L 25/36; H04L 25/40
[52] U.S. Cl. .......................... 375/371; 327/152
[58] Field of Search .................. 370/100.1, 105, 370/105.3, 108; 371/1, 47.1; 327/2, 3, 22, 23, 24, 27, 1, 141, 144, 150, 152, 147, 155–156, 159; 375/371–376, 354, 362

[56] References Cited

U.S. PATENT DOCUMENTS

4,012,598  3/1977  Wiley ........................... 375/118
4,860,283  8/1989  Takano et al. ................. 370/105
5,022,056  6/1991  Henderson et al. ............. 370/108

Primary Examiner—Stephen Chin
Assistant Examiner—Hai H. Phan
Attorney, Agent, or Firm—Baker & Botts

[57] ABSTRACT

A data phase alignment circuit (34) is provided to align incoming plesiochronous data with a known clock phase. Multiple phases of a clock signal are provided to a data capture circuit (40), which captures the incoming plesiochronous data with at least one of the clock phases. A data transition decoder (44) then determines the time of data transition with respect to the multiple phases of the clock. The captured data is then realigned with a selected phase of the multiple clock phases by a data retimer circuit (50) and provided as the output (64). The resultant data is therefore aligned with a known phase of the clock signal and is no longer plesiochronous with respect to the clock signal. Data shifting due to data jitter, drift and wander may also be correct with a slip buffer (38).

16 Claims, 6 Drawing Sheets

DATA PHASE ALIGNMENT CIRCUITRY

TECHNICAL FIELD OF THE INVENTION

This invention relates in general to the field of digital circuits. More particularly, the present invention relates to a circuitry and method for aligning plesiochronous data to a known clock phase.

BACKGROUND OF THE INVENTION

Timing considerations are important in many digital circuit applications. A circuit functioning under one clock rate may be required to receive and operate on data transmitted at another clock rate. At other times, a circuit may be required to receive and operate on data transmitted at the same clock rate but aligned to an unknown phase, or what is known as plesiochronous data. In these applications, the circuit may be required to capture the data under unstable conditions in which there are no setup or hold requirements for the input data relative to the internal circuit clock.

One way to achieve phase alignment in these applications is to oversample the incoming data according to a Nyquist criteria. A serious disadvantage associated with oversampling is the amount of logic circuitry required to process and store the large quantity of sampled data. In most applications, the large amount of required circuitry presents a formidable obstacle. The inadequacy of using oversampling to achieve phase alignment is especially apparent when incoming data is arriving at a fast rate.

In the telecommunications field, telephony, digital, and video data are transmitted and switched by telephone networks at fast data rates. These data may be in any data format, such as DS1, DS3, T1, STS-1, and SONET. In order to properly switch, transmit or perform other data transformation processes, the plesiochronous data must be captured and transformed to one that is synchronous and phase-aligned with respect to a selected clock signal. For example, a crosspoint or crossconnect switch may be required to receive and switch plesiochronous data under unstable conditions prior to switching and outputting the switched data to the telephone network.

In addition to the plesiochronous nature of the data, long cables interconnecting the various communications components in the system may introduce timing delays and variations. For example, the physical distance between an originating stage or a terminating stage and the crosspoint switch may be on the order of one hundred and fifty feet or more. Further timing problems, such as jitter, wander, and drift inherent in telephony data, are introduced by large ambient temperature variations and aging of the system components. When substantial shifting of data with respect to the clock occurs, data bits are essentially deleted or added, depending on the direction of the data shift. If left uncorrected, such data shifts may result in erroneous or difficulty in embedded bit pattern framing downstream. Therefore, to eliminate or greatly reduce error in the transmitted data, these timing problems must also be resolved.

Accordingly, a need has been identified for a circuitry or method to capture and realign plesiochronous data. Furthermore, timing and framing problems arising from data drifting, jitter, and wander also require adequate resolution.

SUMMARY OF THE INVENTION

In accordance with the present invention, a data phase alignment circuitry and a method for the same are provided which substantially eliminate or reduce disadvantages and problems associated with prior implementations.

In one aspect of the present invention, multiple phases of a clock signal are generated and a data capture circuit is used to capture the incoming plesiochronous data with at least one of the clock phases. Plesiochronous data are data that are not aligned with any particular phase of the clock. The captured data is then realigned with a selected phase of the multiple clock phases and provided as the output. The resultant data is therefore aligned with a known phase of the clock signal and is no longer plesiochronous with respect to the clock signal.

In another aspect of the present invention, a slip buffer is further provided to correct shifting of the data with respect to the clock signal. Depending on the direction and amount of the data shift, the slip buffer either adds or deletes an appropriate number of bit time to or from the data path of the output data.

In yet another aspect of the present invention, a data capture circuit is provided to clock in the data at multiple phases of the clock signal. A data transition decoding circuit then examines the captured data to determine between which clock phases the data transition occurred. With this information, a data retiming circuit then may align the captured data with a selected phase of the clock and provide the aligned data as the output. A slip buffer may be further provided to adjust data shifts in the forward or backward direction as needed.

The data phase alignment circuitry may be coupled to a microprocessor for additional control capabilities. The data phase alignment circuitry may be employed wherever data alignment to a particular clock signal is desired. In particular, it is desirable to couple the data phase alignment circuitry between an originating stage and a cross-connect switch in a telecommunication system transmitting telephony, video, and other digital information so that data is properly aligned with respect to an internal clock prior to switching and routing.

An important technical advantage of the present invention provides data phase alignment without oversampling the data and the disadvantages associated therewith. An interface is achieved for receiving data that are plesiochronous and realigning the data to a known clock phase.

In the telecommunications field, data jitter, drift and wander is inherent in the system due to wide temperature variations and component aging. Yet another technical advantage of data phase alignment circuitry provides timing correction where data shifting with respect to system clock occurs. This feature reduces error and facilitates framing embedded bit patterns downstream.

BRIEF DESCRIPTION OF THE DRAWINGS

For a better understanding of the present invention, reference may be made to the accompanying drawings, in which.

DETAILED DESCRIPTION OF THE INVENTION

Figure 1:
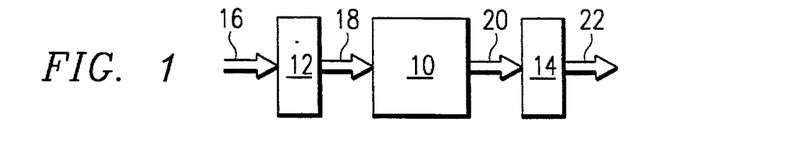
FIG. 1 is a simplified top level block diagram of a telephone switching system.

FIG. 1 of the drawing figures illustrates one exemplary environment for the data phase alignment circuitry of the instant invention. A telephony switch 10 is coupled between an originating stage 12 and a terminating stage 14. Originating stage 12 receives telephony, digital, and video data 16 and performs some data transformation processes before providing the data to switch 10. These transformations may include changing the data formats of data 16 from various industry standard formats, such as DS1, DS3, T1, STS-1, and SONET, to one or more internal data format of switch 10. Switch 10 then receives formatted data 18, switches the data to the desired output, and provides switched data 20 to terminating stage 14. The data is then retransformed to standard industry formats 22, and delivered to the telephone network (not shown) to be forwarded to the destination.

In the environment described in FIG. 1, incoming data 18 from originating stage 12 are plesiochronous with respect to the internal clock of switch 10. In other words, the times at which the data are transitioning are unknown. Data phase alignment circuitry of the instant invention is adapted for capturing the plesiochronous data and aligning the data with a selected clock phase before providing the data to switch 10.

Figure 2:
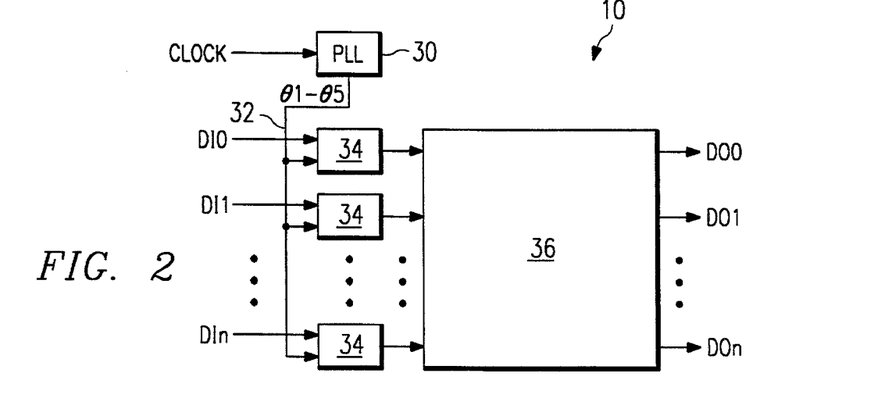
FIG. 2 is a block diagram of a crosspoint switch with data phase alignment circuitry.

Referring to FIG. 2, an embodiment of switch 10 includes a phase-locked loop (PLL) 30, which generates multiple phases $\theta_1$ to $\theta_5$ of a CLOCK signal. Phase-locked loop 30 is described in more detail below in conjunction with FIG. 3. A predetermined number of data phase alignment circuitry 34 receive incoming plesiochronous serial data DI0 to DIn from originating stage 12. The number of input data is determined by the number of data channels switch 10 is designed to process. Each data phase alignment circuitry 34 receives phases $\theta_1$ to $\theta_5$ of CLOCK signal, the serial data, and aligns the data with a selected phase of CLOCK signal. The aligned data is then provided to a switching matrix 36, which switches and routes the data to the desired outputs DO1 to DOn of matrix 36.

Figure 3:
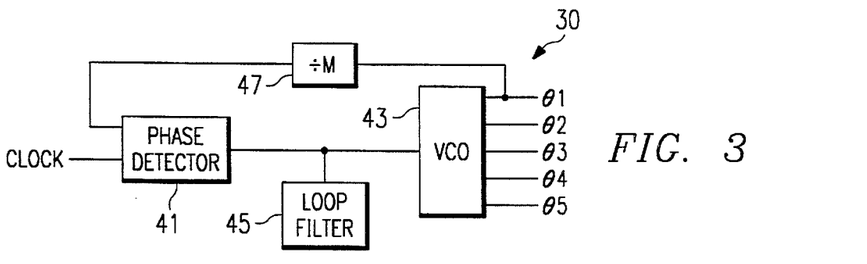
FIG. 3 is a multiple clock phase generator in the form of a phase-locked loop.

An exemplary embodiment of the multiple clock phase generator, Phase-locked loop 30, is shown in FIG. 3. Generally, phase-locked loop 30 receives an input CLOCK signal of a predetermined frequency and generates an internal clock of a different frequency from the input CLOCK signal. Phase-locked loop 30 includes a phase detector 41 coupled to a voltage-controlled oscillator (VCO) 43 and a loop filter 45. Phase detector 41 compares input CLOCK signal with a divided down output from voltage-controlled oscillator 43 and generates an error voltage. The error voltage may be filtered by external loop or low-pass filter 45 to remove high frequency noise or alternating-current (ac) components before being received by voltage-controlled oscillator 43. Voltage-controlled oscillator 43 outputs multiple phases of the internal clock.

More particularly, an implementation may provide for an input CLOCK signal of 6.48 MHz, and the generated internal clock signal would be 51.84 MHz if the output of voltage-controlled oscillator is divided down eight times. It has been shown that for these clock frequencies and the operations of data phase alignment circuitry 34, five clock phases, $\theta_1$ to $\theta_5$ each skewed approximately 3.86 nanoseconds, are adequate.

Figure 4:
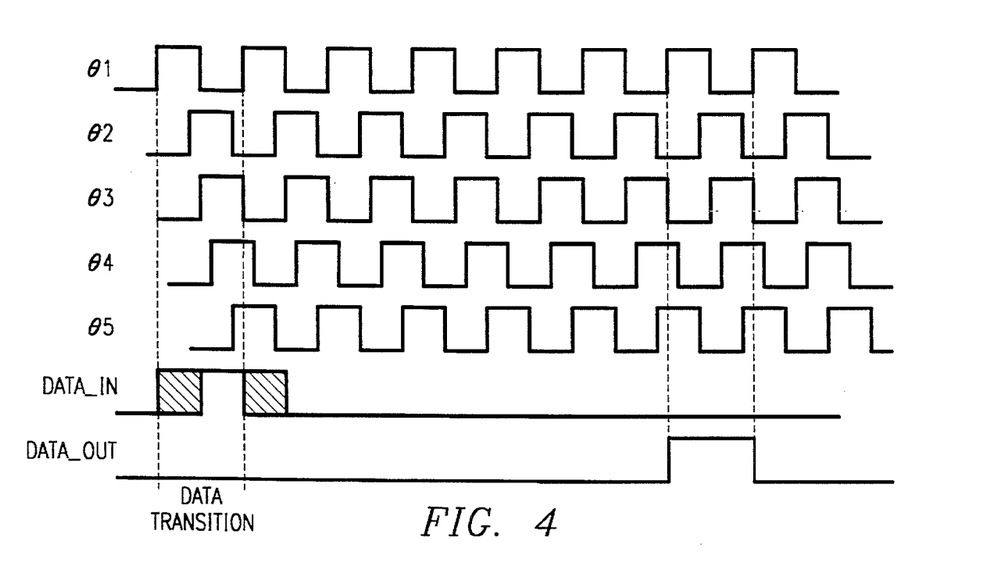
FIG. 4 is a timing diagram demonstrating the operation of the data phase alignment circuitry.

FIG. 4 shows a timing diagram of clock phases $\theta_1$ to $\theta_5$ with respect to input serial data, DATA_IN, and output serial data, DATA_OUT, of a data phase alignment circuitry 34. Serial data, DATA_IN, may be any one of input data streams, DI0 to DIn, shown in FIG. 2. As shown, plesiochronous input serial data, DATA_IN, may be available at the rising edge of any one phase of the internal clock signal. The task of data phase alignment circuitry 34 is to capture the data at the active edge of one of the phases of the internal clock, realign the data to a selected phase of the clock, and to detect and correct for data shifting. As shown in FIG. 4, the output data, DATA_OUT, is aligned with $\theta_1$ of the internal clock.

Figure 5:
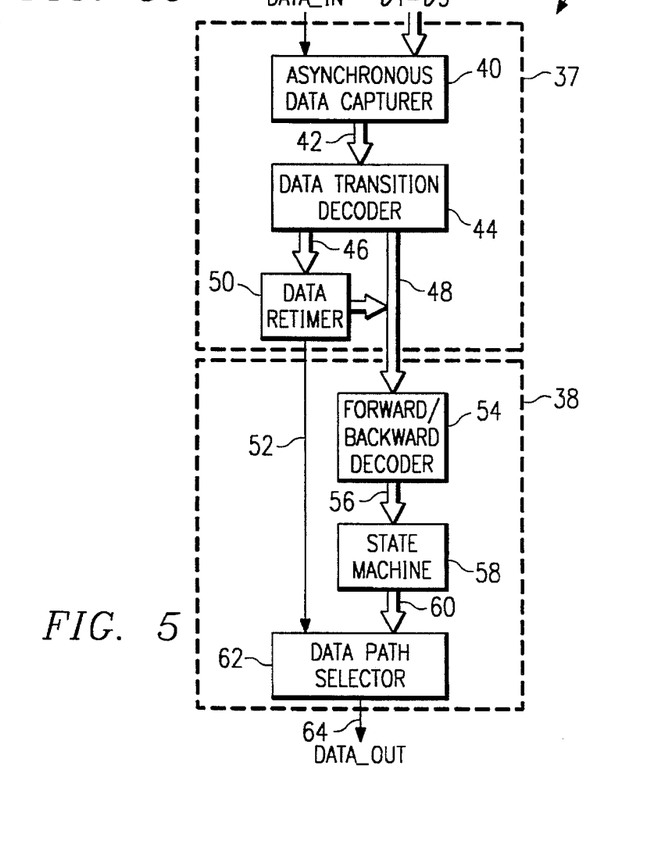
FIG. 5 is a functional block diagram of a preferred embodiment of the data phase alignment circuitry.

For ease of discussion, data phase alignment circuitry 34 is shown broken down into functional blocks in FIG. 5, and is described below in conjunction with the detailed schematic diagrams in FIGS. 6a–c and 7a and 7b.

Data phase alignment circuitry 34 is comprised of two major function blocks, a retiming circuitry 37 and a slip buffer 38, each performing distinct functions. In general, retiming circuitry 37 performs the task of aligning DATA_IN to a selected phase of the internal clock, and slip buffer 38 performs the task of correcting data shifts with respect to the internal clock boundaries. Each of these function blocks is discussed in turn.

Figure 6A:
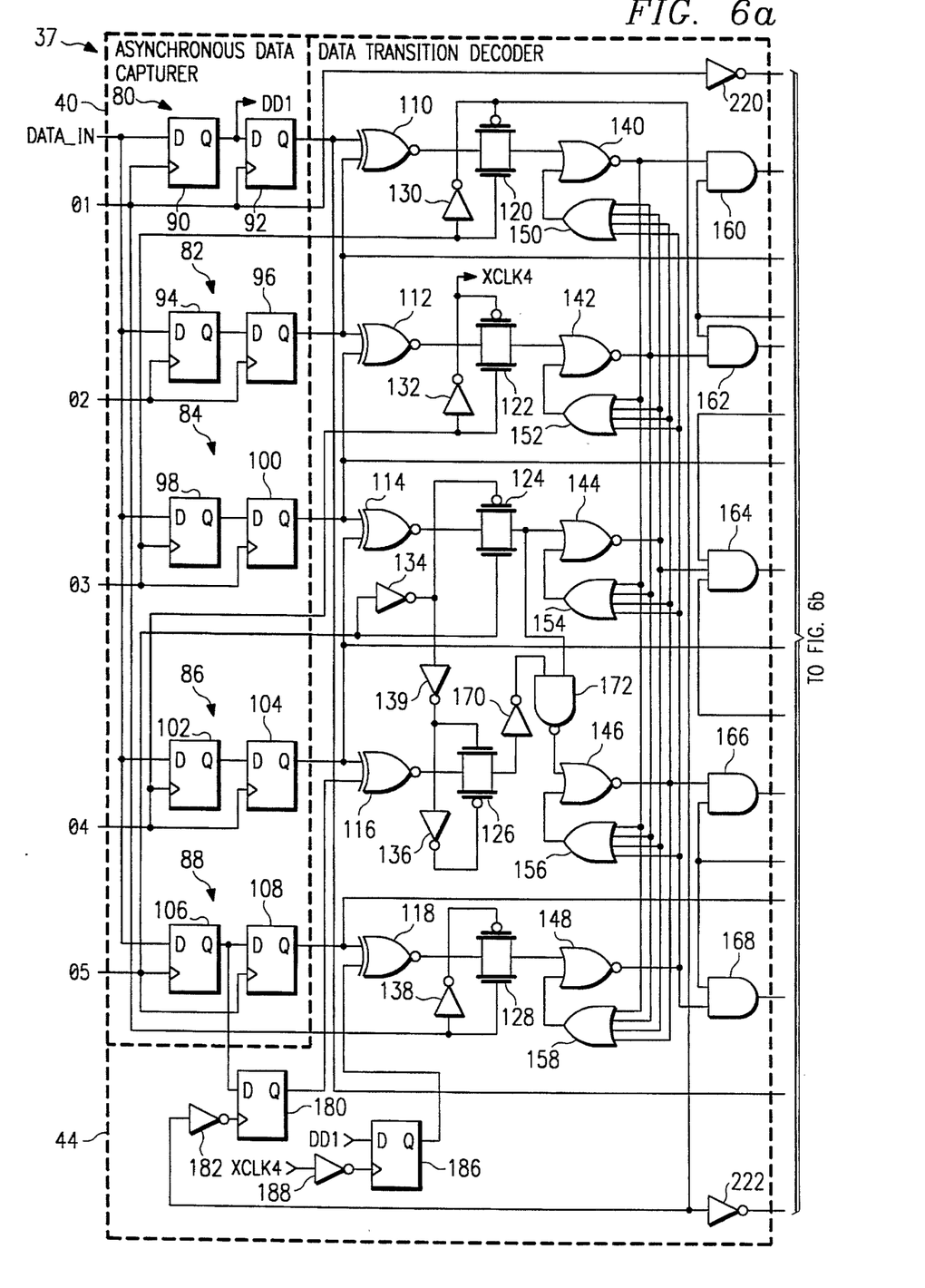
FIGS. 6a–6c are circuit schematic diagrams of a preferred embodiment of a retimer circuit.

Retiming circuitry 37 includes an asynchronous data capturer 40 which receives serial input data, DATA_IN, and phases $\theta_1$ through $\theta_5$ of the internal clock. The task of asynchronous data capturer 40 is to capture the incoming data at the active edge of at least one of the five clock signals. Referring to FIG. 6a, this task may be implemented by pairs 80–88 of cascaded D flip-flops 90–108 each pair receiving serial input data, DATA_IN, and being clocked by one phase of the internal clock. Implemented in this manner, depending on where the data transition occurs, the data is captured by a selected one or more pairs of the flip-flops.

The captured data and selected clock signals 42 are then passed on to the next function block, a data transition decoder 44, of retiming circuitry 37. Data transition decoder 44 generally performs the task of determining the occurrence of the data transition with respect to the five clock phases. In other words, data transition decoder 44 determines, between the active edges of which phases of the clock, the data transition took place.

The task of data transition decoder 44 may be implemented as shown in FIG. 6a. The data signal clocked by each pair of D flip-flops 80–88 are passed to an exclusive-NOR gate, which takes the inverse of exclusive-OR of the data signal with the data signal from the successive D flip-flop pair. A data transition is therefore indicated by one input to the exclusive-NOR gate being low and the other being high, which results in a low at the output of the exclusive-NOR gate.

For example, exclusive-NOR gate 110 takes the exclusive-NOR of the data signal clocked in by $\theta_1$ and the data signal clocked in by $\theta_2$ of the internal clock; exclusive-NOR gate 112 takes the exclusive-NOR of the data signal clocked in by $\theta_2$ and the data signal clocked in by $\theta_3$ of the internal clock; and exclusive-NOR gate 114 takes the exclusive-NOR of the data signal clocked in by $\theta_3$ and the data signal clocked in by $\theta_4$ of the internal clock. The arrangement for $\theta_4$ and $\theta_5$ data is somewhat different to accommodate timing peculiarities that may be present in the incoming data, but the basic concept remains the same. Exclusive-NOR gate 116 takes the output from D flip-flop 104 clocked in by $\theta_4$ and the output from a D flip-flop 180, which provides a more stabilized $\theta_5$ data. As shown, D flip-flop 180 is clocked by $\theta_3$ of the internal clock. Similarly, exclusive-NOR gate 118 operates on $\theta_5$ data from D flip-flop 108 and a more stabilized $\theta_1$ data from the output of a D flip-flop 186. Note that D flip-flop 186 receives $\theta_1$ data (shown as signal DD1) from the output of flip-flop 90 and is clocked by $\theta_4$ (shown as XCLK4).

The outputs from exclusive-NOR gates 110–118 are then provided to complementary MOS (CMOS) transmission gates 120–128, respectively, which are controlled by clock phases $\theta_3$, $\theta_4$, $\theta_5$, $\theta_5$, and $\theta_1$, respectively, for $\theta_1$, $\theta_2$, $\theta_3$, $\theta_4$, and $\theta_5$ data. Inverters 130–138 provide the complements of respective clock phase signals. As shown, inverter 139 may be used to provide additional drive capability for the $\theta_5$ clock signal. The outputs from transmission gates 120–128 are then provided to NOR gates 140–148, the other input of which receives the outputs of OR gates 150–158, respectively. The input to each OR gate 150–158 is the collection of the outputs of all other respective NOR gates 140–148. In effect, the output of a NOR gate is high or a logic one if the input of the respective exclusive-NOR gate sees a low and high in its respective phase data and its successive phase data. When the input to an exclusive-NOR gate is a low and a high, the indication is that a data transition occurred between the respective clock phase and the next clock phase.

Because of potential timing complications, the arrangement for $\theta_4$ data is slightly modified. Transmission gate 126, as shown, is coupled to an inverter 170, the output of which is coupled to one input of a NAND gate 172. The other input of NAND gate 172 receives the $\theta_3$ data from transmission gate 124. In operation, glitches are restricted from propagating to gate 158.

Figure 6B:
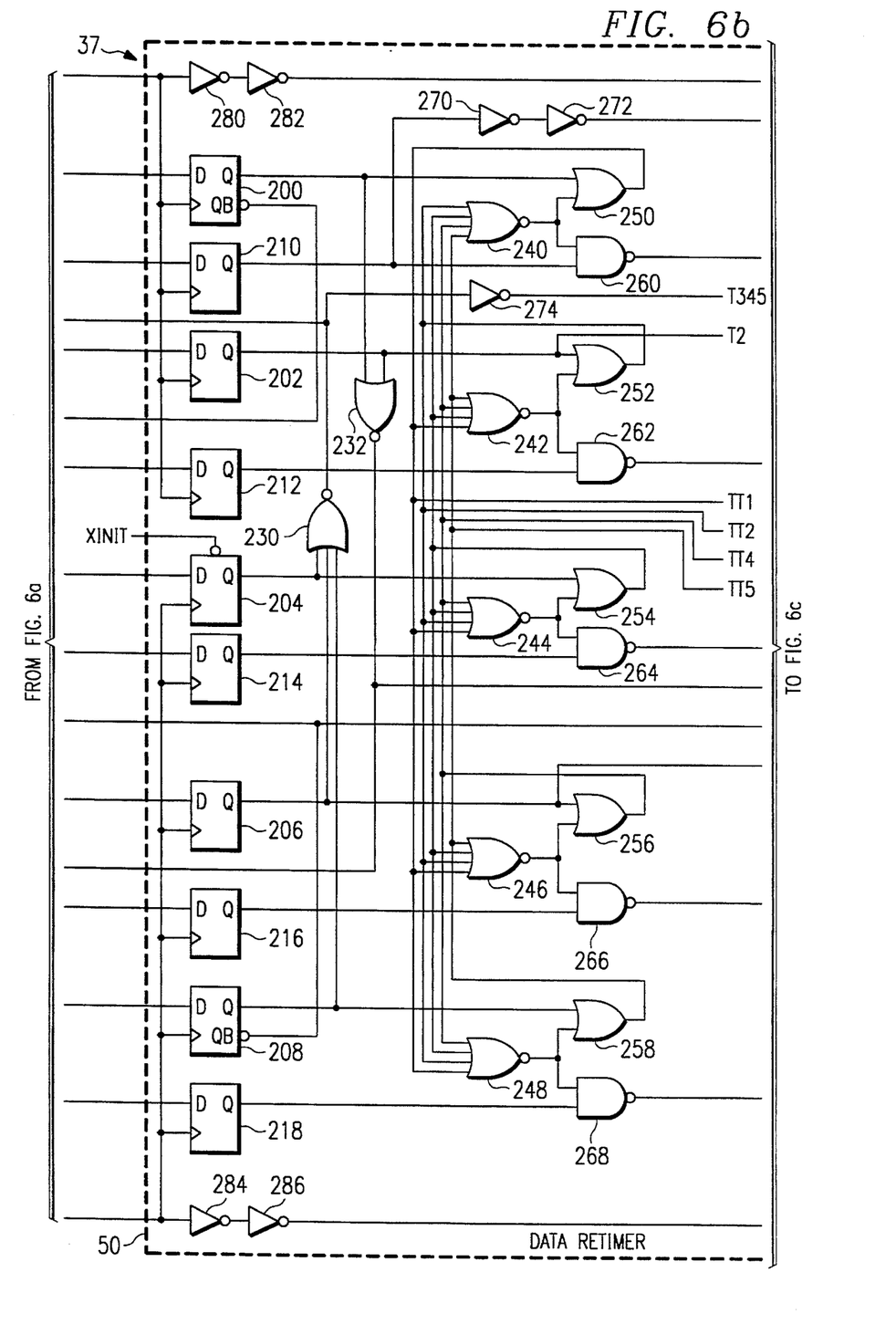
Figure 6C:
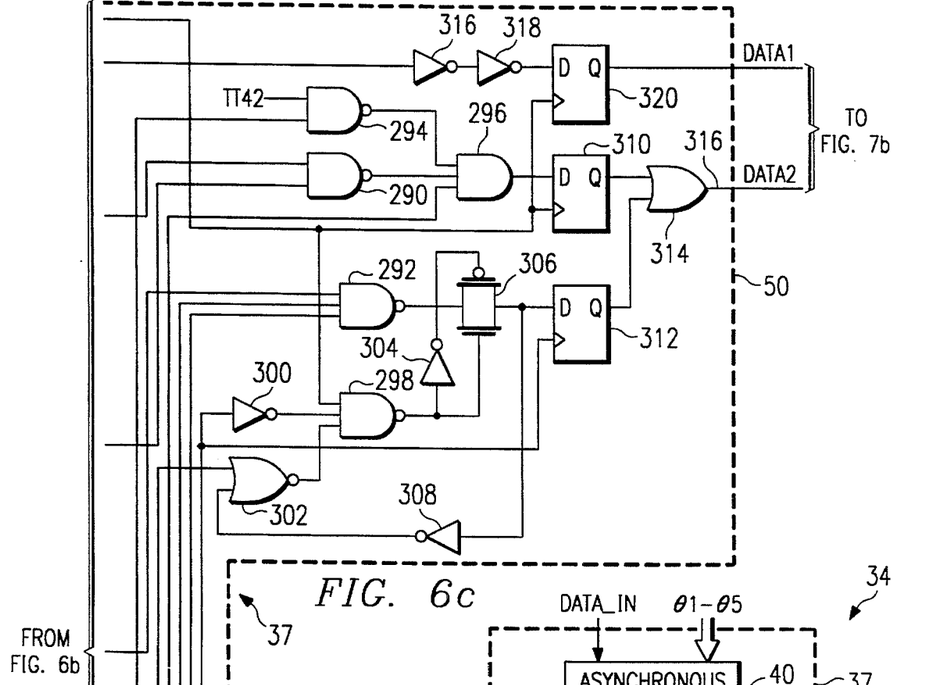

Data retimer circuit 50, as shown in FIGS. 6b and 6c, generally realigns the captured data with $\theta_1$ of the internal clock signal. This is done by first aligning the data to either $\theta_1$ or $\theta_3$ of the clock signal, and then realigning the data with the $\theta_1$ clock edge. Some data transition information are also derived for use in slip buffer 38.

The outputs of NOR gates 140–148 are provided to one input of AND gates 160–168, respectively, and the other input of which receives some feedback signals from data retimer circuit 50 shown in FIG. 6b. The output of each AND gate 160–168 is fed into respective D flip-flops 200–208 of data retimer circuit 50, the first two being clocked with the $\theta_1$ clock signal and the rest being clocked with the $\theta_3$ clock signal. The outputs of D flip-flops 200 and 202 are then provided to the input of a NOR gate 232, which generates a composite signal indicating that a data transition took place between the $\theta_1$ and $\theta_2$ clock edges. The output of NOR gate 232 is fed back to AND gates 166 and 168 in order to block out indications that the data transition occurred between the $\theta_3$, $\theta_4$, and $\theta_5$ clocks.

The outputs of D flip-flops 204–208 are provided to the input of a NOR gate 230, which generates a composite signal indicating that the data transition occurred between the $\theta_3$, $\theta_4$, and $\theta_5$ clocks. The output of NOR gate 230 is fed back to AND gates 160 and 162 to block out indications that the data transition took place between the $\theta_1$ and $\theta_2$ clocks. Further feedback signals are provided by the inverse output of flip-flop 200 which is fed to one input of AND gate 164 associated with the $\theta_3$ data. The other input of AND gate 164 receives the feedback inverse output of flip-flop 208.

Another set of D flip-flops 210–218 aligns the input data, DATA_IN, at either the $\theta_1$ or $\theta_3$ clock edge. D flip-flops 210 and 212 receive the outputs of flip-flops 96 and 100, respectively, and are clocked by $\theta_1$. D flip-flops 214–218 receive the outputs of flip-flop 104, 108, and 92, respectively, and are clocked by $\theta_3$.

In operation, if the data transition occurred between $\theta_1$ and $\theta_2$ or $\theta_2$ and $\theta_3$ clock edges, the data is realigned with the $\theta_1$ clock edge. If the transition occurred between $\theta_3$ and $\theta_4$, $\theta_4$ and $\theta_5$ or $\theta_5$ and $\theta_1$ clock edges, the data is realigned with the $\theta_3$ clock edge. The feedback of $\theta_1$ and $\theta_2$ D flip-flops 200 and 202 outputs to AND gates 166, and 168 and the inverse flip-flop 200 output to AND gate 164 serve to block out the outputs of the flip-flops 204–208 associated with $\theta_3$, $\theta_4$, and $\theta_5$. The same arrangement is made for the outputs of $\theta_3$, $\theta_4$, and $\theta_5$ flip-flops 204–208 to block out flip-flops 200 and 202 associated with $\theta_1$ and $\theta_2$.

The outputs from flip-flops 200–218 are further provided to a configuration of logic gates to derive data transition information used in data retimer 50 and slip buffer 38. These logic gates include NOR gates 240–248, OR gates 250–258, and NAND gates 260–268 coupled as shown in FIG. 6b. Inverters 270 and 272 provide additional load capacity for the output of flip-flop 210. Also to increase fan-out, $\theta_1$ and $\theta_3$ clock signals are additionally driven by inverters 280, 282, 284, and 286, respectively. The resultant clock signals are $\theta_1$ and $\theta_3$ clock signals delayed by some known amount, as introduced by the inverters. Certain derived signals are labeled in the drawing figures for ease of reference and explanation.

Referring to FIG. 6c, data retimer 50 includes a final retiming stage which aligns data to $\theta_1$ of the clock signal. This may be accomplished by the logic circuit configuration shown in FIG. 6c. In essence, the output of OR gate 314 carries the data clocked in at either $\theta_1$ and $\theta_2$ or $\theta_3$, $\theta_4$, and $\theta_5$ clock edges with the first group aligned with the $\theta_1$ clock and the second with the $\theta_3$ clock. This may be implemented by providing data signals from the output of NAND gates 260 and 262 (FIG. 6b), representing $\theta_1$ and $\theta_2$ data, to the input of NAND gate 290. An AND gate 296 receives the output of NAND gate 290, the inverse of $\theta_5$ data, and other control signals generated by forward/backward decoder 54 (FIG. 7a) to produce, in effect, $\theta_1$ or $\theta_2$ data. Since this $\theta_1$ or $\theta_2$ data is then clocked in by a D flip-flop 310 at the $\theta_1$ clock edges, the data is aligned with the $\theta_1$ clock.

The $\theta_3$, $\theta_4$ and $\theta_5$ data signals from NAND gates 264–268 (FIG. 6b) are provided to the input of NAND gate 292, the output of which is passed by a transmission gate 306 controlled by a composite of clock signals from a NAND gate 298. NAND gate 298 receives at its inputs the delayed $\theta_1$ clock, the inverse of the delayed $\theta_3$ clock from inverter 300, and the output of a NOR gate 302. NOR gate 302 generates a signal indicative of data not transitioning at the $\theta_1$ and $\theta_2$ clock edges. The output of transmission gate 306 is fed to a D flip-flop 312, clocked by the delayed $\theta_3$ clock. The outputs from flip-flops 310 and 312 are then provided to the inputs of an OR gate 314, which is routed to data path selector 62 shown in FIG. 7b. The output from OR gate 314, labeled DATA2, carries the data clocked in at one of the clock phases. The output of D flip-flop 210 having $\theta_2$ data (FIG. 6b), bolstered by inverters 270 and 272 is further fed through inverters 316 and 318 for fan-out considerations, and provided to a D flip-flop 320. The output of flip-flop 320, labeled DATA1, is also routed to data path selector 62 of FIG. 7b.

Figure 7A:
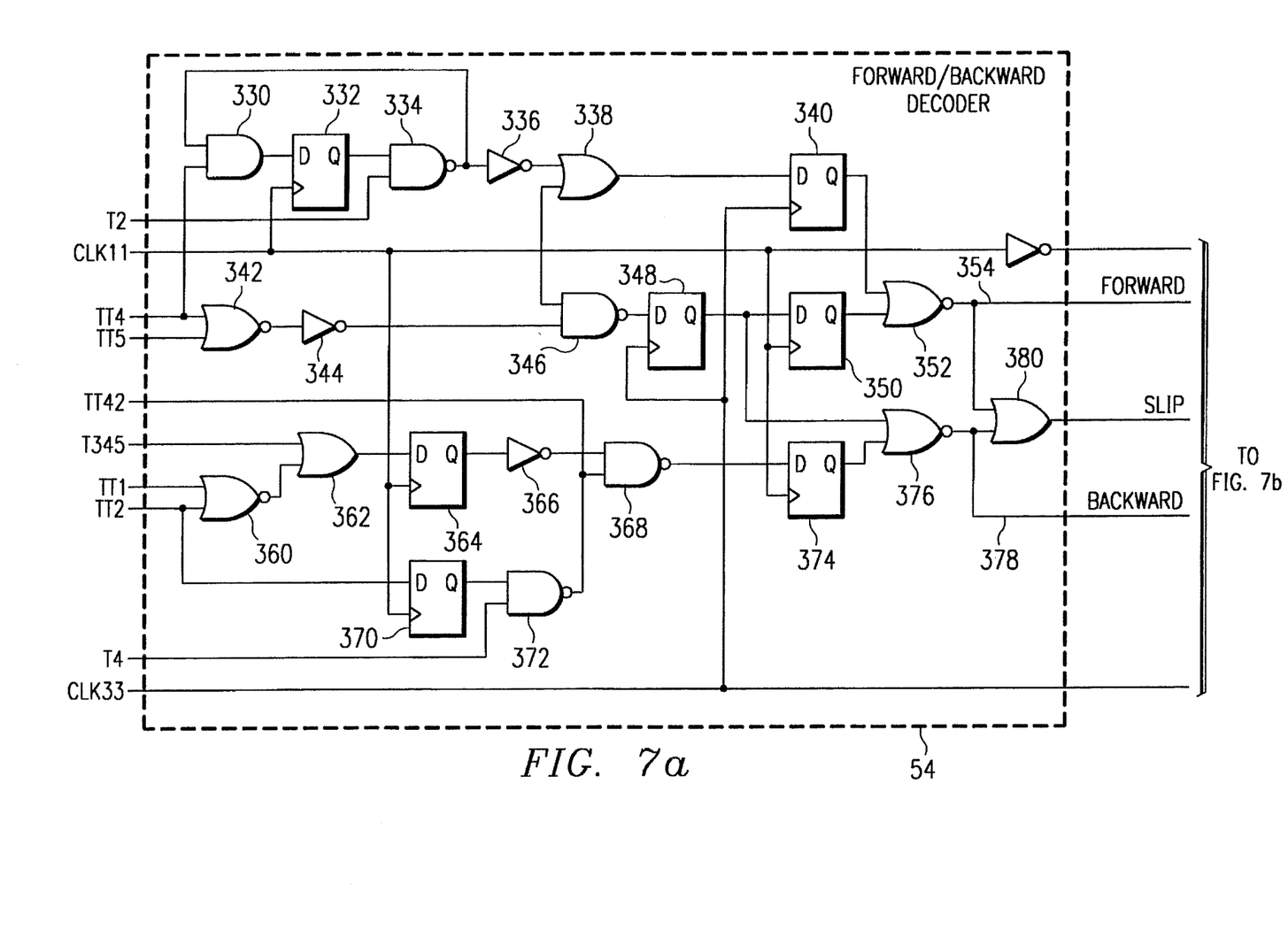
FIGS. 7a and 7b are circuit schematic diagrams of a preferred embodiment of a slip buffer circuit.

Referring to FIG. 7a, a detailed schematic of an implementation of forward/backward decoder 54 is shown. Forward/backward decoder 54 determines whether data have slipped or drifted past a clock boundary, and whether the direction of drift is forward or backward. For example, if data initially transitioned between $\theta_1$ and $\theta_2$ clock edges, but now transitions between $\theta_4$ and $\theta_5$ clock edges, the data has slipped backward one clock boundary. If data transitioned between $\theta_3$ and $\theta_4$ clock edges, but now transitions between $\theta_1$ and $\theta_2$ clock edges, the data has slipped forward two clock boundaries. This task may be implemented with the logic circuit shown in FIG. 7a. The resulting signals are labeled FORWARD, BACKWARD, and SLIP, indicating a forward data shift, backward data shift, and that a data shift has occurred, respectively.

Forward/backward decoder 54 includes an AND gate 330 receiving a signal TT4 from data retimer 50 (FIG. 6b), and a feedback signal from a NAND gate 334. The output of AND gate 330 is provided to the input of a D flip-flop 332 clocked by a delayed $\theta_1$ clock, the output of which is provided to one input of NAND gate 334. The other input of NAND gate 334 receives a T2 signal from data retimer of FIG. 6b. The output of NAND gate 334 is inverted by an inverter 336 and provided to an input of an OR gate 338, the output of which is fed to another D flip-flop 340 clocked by the delayed $\theta_3$ clock.

A NOR gate 342 receives inputs TT4 and TT5 indicating data transition taking place between $\theta_4$ and $\theta_5$, and $\theta_5$ and $\theta_1$ clock edges, respectively, and provides its output to an inverter 344. The output of inverter 344 is coupled to an input of a NAND gate 346, another input of which receives T12 from data retimer 50 of FIG. 6b. The output of NAND gate 346 is provided to D flip-flop 348, which is clocked by the $\theta_3$ clock. The output of flip-flop 348 is further coupled to a D flip-flop 350, which is clocked by the $\theta_1$ clock. The outputs from flip-flops 340 and 350 are fed to a NOR gate 352, which generates the FORWARD signal.

The BACKWARD signal is generated by another series of logic gates. A NOR gate 360 receives signals TT1 and TT2 from data retimer 50 (FIG. 6b), the output of which is provided to one input of an OR gate 362. OR gate 362 also receives the T345 signal from data retimer circuit 50 (FIG. 6b), and provides its output to a D flip-flop 364 clocked by the $\theta_1$ clock. The output of flip-flop 364 is inverted by an inverter 366, and received by one input of a NAND gate 368. The other input of NAND gate 368 receives the output from a NAND gate 372, which operates on signal T4 and the output of a D flip-flop 370, latching signal TT2 on the $\theta_1$ clock. The output of NAND gate 368 is then provided to a D flip-flop 374, which is also clocked by the $\theta_1$ clock. A NOR gate 376 receives the output from flip-flops 374 and 348 and generates the BACKWARD signal. An OR gate 380 takes the FORWARD and BACKWARD signals and generates the SLIP signal. The $\theta_1$ clock signal is inverted by an inverter 382 for use by state machine 58, shown in FIG. 7b.

Figure 7B:
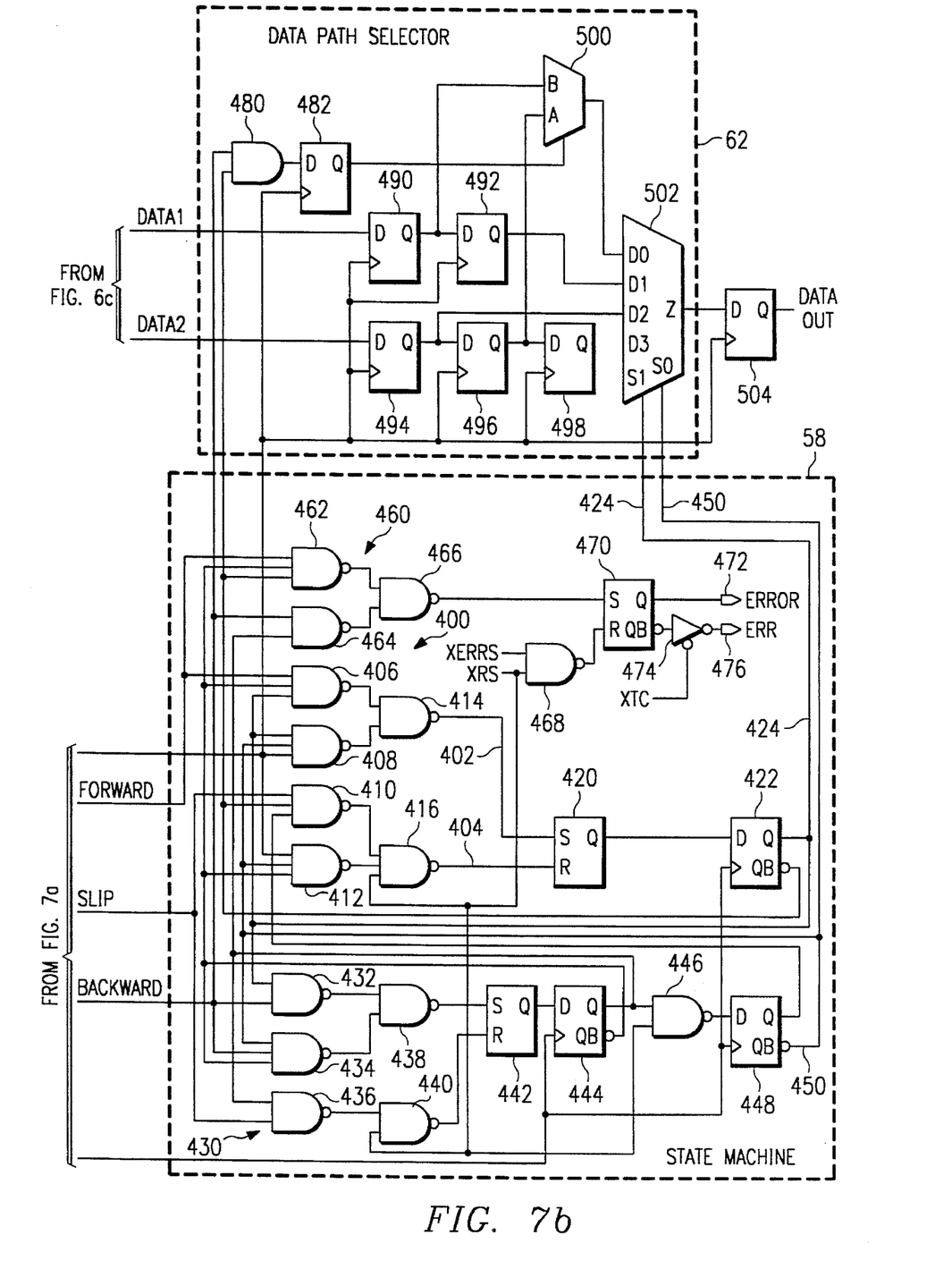

State machine 58, shown in FIG. 7b, receives the FORWARD, BACKWARD, and SLIP signals from forward/backward decoder 54, and generates the control signals S1, S0 for data path selector 62. State machine 58 also keeps count of the number of times the shift occurs in any one direction, and issues an error signal if the count exceeds a predetermined maximum. In the implementation shown, the number of consecutive shifts in one direction is limited to one. As one expects, this number is purely application dependent and the implementation may be modified to accommodate two successive shifts in one direction, for example.

The operation of state machine 58 and data path selector 62 is better demonstrated by referring to the following truth table:

| STATE | S1 | S0 | FORWARD | BACKWARD | S1 | S0 | DATA PATH |
|---|---|---|---|---|---|---|---|
| 1 | 0 | 0 | 1 | 0 | 1 | 0 | D2 |
| 2 | 1 | 0 | 0 | 1 | 0 | 0 | D0 |
| 3 | 1 | 0 | 1 | 0 | 0 | 0 | ERROR |
| 4 | 0 | 0 | 0 | 1 | 0 | 1 | D1 |
| 5 | 0 | 1 | 0 | 0 | 1 | 1 | D3 |
| 6 | 0 | 1 | 1 | 0 | 0 | 0 | D0 |
| 7 | 1 | 1 | 1 | 0 | 0 | 0 | D0 |
| 8 | 1 | 1 | 0 | 1 | 0 | 0 | ERROR |
| 9 | X | X | $\overline{XRS}$ |  | 0 | 0 | RESET |

As indicated in the above truth table, there are nine possible states, two of which are error states, and one a reset state. The signals S1 and S0 refer to the select inputs of multiplexor 502 generated by state machine 58, and the FORWARD and BACKWARD signals refer to the output by the same name from forward/backward decoder 54. The signals S1 and S0 determines, in effect, which delay path is to be used for the data. For example, when S1 and S0 are both low, the D0 input or the output of multiplexor 500 is selected, which may be either DATA2 clocked by a delayed $\theta_1$ clock and delayed by two clock cycles or DATA1 also clocked by a delayed $\theta_1$ clock and delayed by one clock cycle, depending on the level of the select line of multiplexor 500. The select signal of multiplexor 500 is derived from the output of a D flip-flop 482, clocked by the delayed $\theta_1$ clock. The S1 signal, from a D flip-flop 424, is fed to the input of an AND gate 480 along with the BACKWARD signal from forward/backward decoder 54, and the output of which is provided to D flip-flop 482. When both the S1 signal and the BACKWARD signal are high, the input to D flip-flop 482 is high, which selects the DATA1 signal clocked by a delayed $\theta_1$ clock and delayed by one clock cycle.

When S1 and S0 are low and high, respectively, the D1 input to multiplexor 502 is selected, which is DATA1 clocked by a delayed $\theta_1$ clock and delayed by two clock cycles. When S1 and S0 are high and low, respectively, the D2 input to multiplexor 502 is selected, which is DATA2 clocked by a delayed $\theta_1$ clock and delayed by one clock cycle. Finally, when S1 and S0 are both high, the D3 input to multiplexor 502 is selected, which is also DATA2 clocked by a delayed $\theta_1$ clock but delayed by three clock cycles. As shown in FIG. 7b, the delays in clock cycles are accomplished by cascaded D flip-flops 490–498.

Referring to state 1 of the truth table, when the present values of signals S1 and S0 are both low, and a data shift in the forward direction is indicated by a high FORWARD signal, state machine 58 generates values high and low, respectively, for the select signals S1 and S0. This results in the D2 input to multiplexor 502 being selected and provided to the output, which is further clocked through a D flip-flop 504 by the delayed $\theta_1$ clock to generate DATA_OUT.

When S1 and S0 are high and low, respectively, and a shift in the backward direction is indicated by a high BACKWARD signal, state machine 58 resets both the S1 and S0 signals and the D0 data path is selected (State 2). However, if instead a shift in the forward direction is indicated when S1 and S0 are high and low, respectively, state machine 58 enters into an error state. Recall that in the implementation shown, two or more successive data shifts in the same direction results in an error. When state machine 58 enters State 1 by one forward shift, and State 3 by another forward shift, two successive shifts in the forward direction are detected and an error is flagged by generating an ERROR output 472. In error states, the D0 input is selected by resetting S1 and S0 signals to multiplexor 502.

When S1 and S0 are both low, and a backward shift is detected, state machine 58 enters State 4, where S1 and S0 are low and high respectively. In State 4, input D1 to multiplexor 502 or DATA1 with three clock cycle delays are selected. State 4 then transitions into State 5, if the FORWARD and BACKWARD signals are both low, resulting S1 and S0 both being set high. In State 5, D3 or DATA2 with three clock cycle delays are selected.

On the other hand, if in State 4 a forward shift is detected, state machine 58 enters State 6, in which both S1 and S0 are reset to low. In State 6, the D0 input to multiplexor 502 is selected. From State 5, if a forward shift is indicated, state machine 58 enters State 7, in which D0 is selected by resetting both S1 and S0 to low. If from State 5, a backward data shift is detected, an error State 8 is entered because of two consecutive backward shifts. In State 8, the S1 and S0 select signals are reset to low to select the D0 input to multiplexor 502. In addition to the above-described states, a reset state is also included, in which a signal labeled XRS issued by a microprocessor (not shown) may be used to reset state machine 58 and select the D0 input to multiplexor 502.

The truth table shown above may be implemented in a number of ways, one of which is shown in FIG. 7b. The error signal ERROR and its associated signal ERR are generated by a Set-Reset flip-flop 470, which in turn receives its Set input from NAND gates 462–466. NAND gates 462–466 receive, as inputs, the signals FORWARD, inverted S0 (from the inverted output of D flip-flop 444), S1, BACKWARD, and S0 (from the output of D flip-flop 444). It can be seen that NAND gates 462–466 generates the logic: (FORWARD·$\overline{S0}$·S1)+(BACKWARD·S0), which produces the needed logic levels for error States 3 and 8. Other states are generated in a similar manner using logic gates 406–416, a Set-Reset flip flop 420, and a D flip-flop 422 for generating select signal S1. NAND gates 432–440 and 446, Set-Reset flip-flops 442, and D flip-flops 444 and 448 generate the select signal S0.

Implemented in this manner, incoming plesiochronous data are captured and aligned with a know clock phase. Furthermore, substantial data shifts in either the forward and backward directions are detected and corrected. Data phase alignment circuit 34 is particularly suited to applications where a system must receive and operate on plesiochronous data.

Although the present invention has been described in detail, it should be understood that various changes, substitutions and alterations can be made thereto without departing from the spirit and scope of the present invention as defined by the appended claims.

What is claimed is:

1. A data phase alignment circuit for aligning data to a selected phase among multiple phases of a predetermined clock signal, comprising:

a data capture circuit for capturing said data clocked in by at least one of said multiple clock phases;

a data transition detection circuit coupled to said data capture circuit for receiving said captured data and detecting between which clock phases said data transitioned;

a data retiming circuit coupled to said data capture circuit for aligning said captured data to said selected phase of said predetermined clock signal and being further coupled to said data transition detection circuit for keeping a history of said detected data transitioning clock phases received from said data transition detection circuit; and a slip buffer circuit coupled to said data retiming circuit for detecting and eliminating substantial data drift relative to said selected phase of said predetermined clock signal.

2. The data phase alignment circuit, as set forth in claim 1, wherein said slip buffer circuit includes a forward/backward circuit coupled to said data transition decoding circuit for determining a direction of said substantial data drift with respect to said selected phase of said predetermined clock signal.

3. The data phase alignment circuit, as set forth in claim 2, wherein said slip buffer circuit further includes a controller coupled to said forward/backward circuit for correcting said substantial data drift in response to said determined direction from said forward/backward circuit.

4. The data phase alignment circuit, as set forth in claim 3, wherein said controller includes a state machine.

5. The data phase alignment circuit, as set forth in claim 3, wherein said slip buffer circuit further includes a data path selector coupled to said controller for introducing varying clock cycle delays to said data.

6. The data phase alignment circuit, as set forth in claim 3, wherein said controller generates an error signal in response to said substantial data drift exceeding a predetermined maximum.

7. A data phase alignment circuit for aligning plesiochronous data to a selected phase of a predetermined clock signal, comprising:

a clock phase generation circuit for receiving said predetermined clock signal and generating multiple phase-locked and equally spaced phases of said clock signal including said selected phase;

a data capture circuit for capturing said data by at least one of said multiple clock phases;

a data transition decoding circuit coupled to said data capture circuit for receiving said captured data and determining between which clock phases said data transitioned; and a data retiming circuit coupled to said data transition decoding circuit for aligning said captured data to said selected phase of said predetermined clock signal, said data retiming circuit further including a history tracking circuit being coupled to said data transition decoding circuit for keeping a history of said detected data transitioning clock phases received from said data transition detection circuit; and a slip buffer circuit coupled to said data timing circuit for eliminating substantial data drift relative to said selected phase of said predetermined clock signal.

8. The data phase alignment circuit, as set forth in claim 7, wherein said slip buffer circuit includes a forward/backward circuit coupled to said data transition decoding circuit for determining a direction of said substantial data drift with respect to said selected phase of said predetermined clock signal.

9. The data phase alignment circuit, as set forth in claim 7, wherein said slip buffer circuit includes a controller for correcting for said substantial data drift.

10. The data phase alignment circuit, as set forth in claim 9, wherein said controller includes a state machine.

11. The data phase alignment circuit, as set forth in claim 9, wherein said slip buffer circuit further includes a data path selector coupled to said controller for introducing varying clock cycle delays to said data.

12. The data phase alignment circuit, as set forth in claim 9, wherein said controller generates an error signal in response to said substantial data drift exceeding a predetermined maximum.

13. A method for aligning plesiochronous data to a selected phase among multiple phases of a predetermined clock signal, comprising the steps of:

capturing said data at one of said multiple clock phases;

determining between which clock phases said captured data transitioned; and aligning said captured data to said selected phase of said predetermined clock signal;

tracking a history of phases between which the data transitioned;

correcting substantial data drift relative to said selected phase of said predetermined clock signal.

14. The method, as set forth in claim 13, wherein said substantial data drift correcting step includes the step of detecting a direction of the substantial data drift.

15. The method, as set forth in claim 14, wherein said substantial data drift correcting step includes the step of introducing varying amounts of clock cycle delay in response to the detected direction of substantial data drift.

16. The method, as set forth in claim 14, further comprising the steps of:

counting a number of consecutive data drifts in the same direction; and generating an error signal in response to the number of consecutive data drifts in the same direction exceeding a predetermined maximum.

* * * * *